March 16, 1965 S. C. TRENCHARD 3,174,154
AUTOMATIC CONTROL APPARATUS FOR REVERSIBLE MOTOR DRIVE
USEABLE WITH A MOTION PICTURE PROJECTOR
Filed Jan. 3, 1962 2 Sheets-Sheet 1

INVENTOR.
Sidney Trenchard
BY

ATTORNEY.

Fig. 3

INVENTOR.
Sidney Trenchard
BY

ATTORNEY.

United States Patent Office 3,174,154
Patented Mar. 16, 1965

3,174,154
AUTOMATIC CONTROL APPARATUS FOR REVERSIBLE MOTOR DRIVE USEABLE WITH A MOTION PICTURE PROJECTOR
Sidney C. Trenchard, Audubon, N.J., assignor to Margaret R. Trenchard, Audubon, N.J.
Filed Jan. 3, 1962, Ser. No. 164,074
6 Claims. (Cl. 352—173)

This invention relates generally to automatic control apparatus and more particularly to automatic control apparatus for driving a reversible motor drive in cycles variable at will.

Cyclically operated motor drives reversibly driven in opposite directions are known. Such drives or apparatus are generally controlled by timing apparatus or programming devices, the operational cycle time of which has been preselected and is not easily varied.

It is a principal object of the present invention to provide control apparatus for controlling the reversible operation of a reversible motor drive with any desired cycle having a time interval as short as one-fifth of a second and a duration as long as desired.

Another object of the present invention is to provide an apparatus for establishing an operation cycle of a reversible motor drive at will and changing it and its duration at will.

Another object of the present invention is to provide an apparatus for viewing sections or preselected lengths of film automatically through sequential and successive periods of time usable, for example at racetracks.

Another object of the present invention is to provide apparatus for reversible automatic operation of a motion picture projector preprogrammed or programmable at will capable of being reversibly operated by racing officials or by the public.

A principal feature of the invention comprises a driven reversible record medium reversibly driven at a speed proportional to the speed of a reversible motor drive, the reversing cycle of which is to be controlled. The record medium is operably connected to the motor drive for reversibly driving the record medium in correspondence with the motor drive. Means are provided, according to the invention, to record, at will, intelligence in the form of commands or instructions on the record medium, while driven, from which command signals are derived. The commands are recorded on the record medium at two separate spaced points and correspond to instructions for initiating reverse operation of the motor drive. The apparatus comprises means to sense the two points on the record medium. Command signals are generated and applied to the reversible driven mechanism to reverse direction of travel of the drive by means responsive to the sensing of the two points or intelligence representative of the commands from the record medium.

Other features, objects and advantages of the present invention will be better understood as shown and described in the following specification and appended claims, in conjunction with the following drawings, in which:

FIG. 3 is a schematic diagram of electronic circuitry of the control apparatus, according to the invention.

Figure 1:
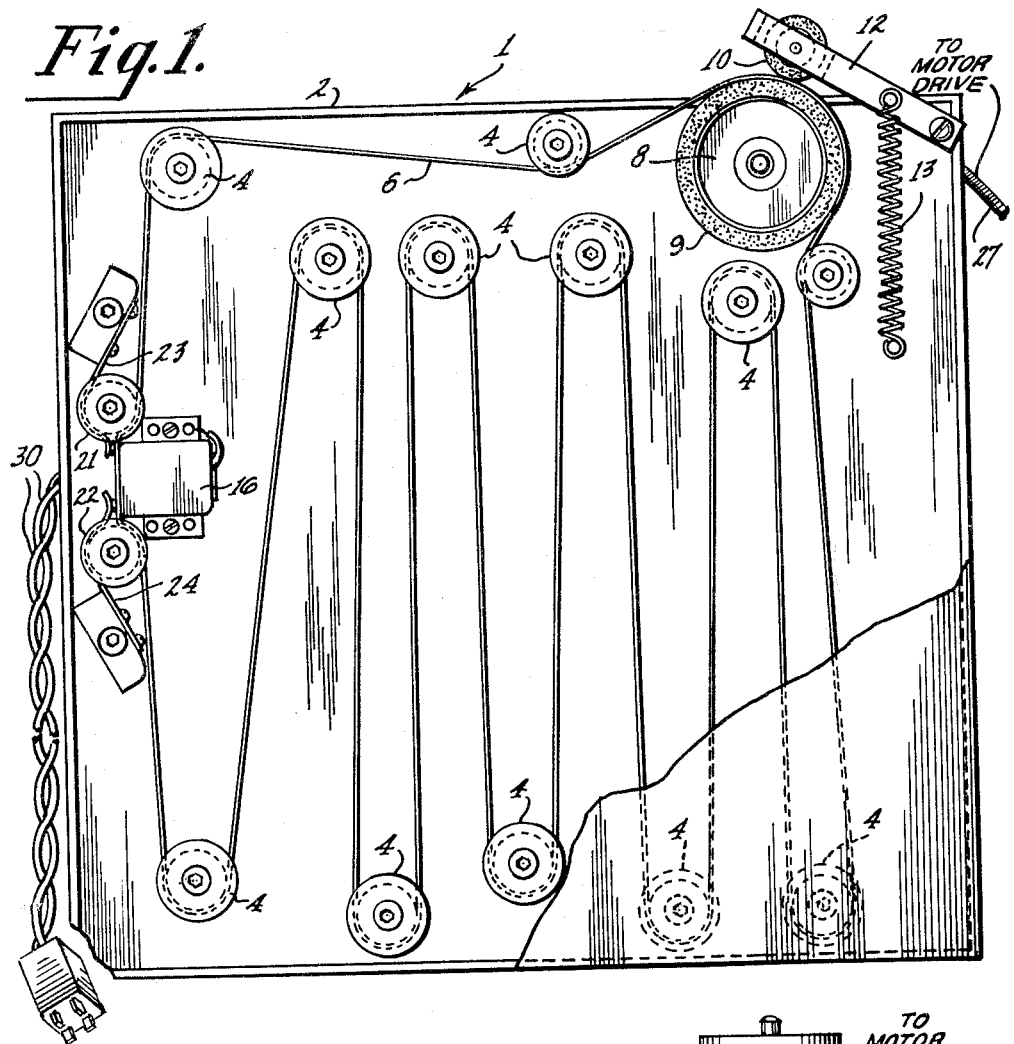
FIG. 1 is an elevation view of a record and playback apparatus functioning as a programmer, according to the invention.
Figure 2:
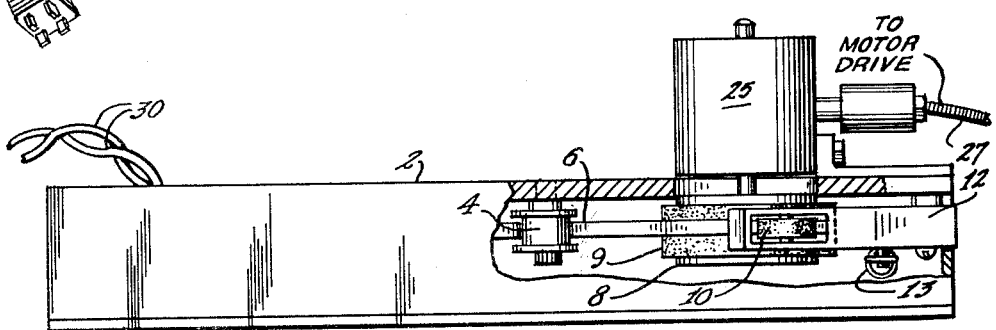
FIG. 2 is a plan view of the apparatus illustrated in FIG. 1.

While the invention will be described as applied to a motion picture projector, for reversibly driving the motion picture projector, it will be understood that the invention is applicable to the operation of other reversible motor drives, for example motor drives for conveyors and the like.

In the illustration of the invention as applied to a motion picture projector the projector is to be used, for example at race tracks for the viewing of motion picture films taken of horse races. Often in horse races objections are raised and disqualifications are allowed or disallowed in connection with fouls occurring during the race. At present at the majority of race tracks motion pictures are taken of each entire race from a series of vantage points which "cover" the complete race track. The films are processed within a few minutes of the finish of the race and are viewed exclusively by stewards when objections are raised by a jockey claiming that one or more of the other horses has committed a foul. Fouls can, of course, be claimed by stewards or judges or trainers or patrol judges.

Heretofore there has never been a way to pick out a length of the race film showing a foul and automatically reversibly drive a projector for repetitively showing the selected length of film. The public is not allowed to view these films in view of the fact that equipment is not provided at the race track capable of selecting the scenes of a film showing the frames of the portion of the race raising an issue as to a foul.

According to the invention, the control apparatus provides for selection of any desired section or length of a film to be shown and the film projector is reversibly operated automatically for successive showings of any length of film which can include a period during which a foul has taken place or the end of a race where there has been a close finish.

In the drawings the control apparatus, according to the invention, comprises a programmer 1 comprising a record and playback apparatus comprising a mount or chassis 2 on which are mounted a plurality of guide rolls 4 on which is threaded an endless record medium 6 reversibly driven longitudinally in opposite directions by a friction or drive roller 8 having a covering 9 of a relatively high coefficient of friction, for example a rubber covering. The drive roller 8 is reversibly driven as hereinafter described. A pressure-applying roller 10 mounted on a pivotally mounted lever 12 biased by a spring 13 in a counterclockwise direction holds the record medium 6 in frictional engagement with the drive roller 8.

The record medium in the example illustrated comprises a magnetic tape 6 on which intelligence or instructions as hereinafter described can be recorded and stored and from which command signals for reversibly driving a motor drive are generated as illustrated hereinafter. The information or intelligence, corresponding to programming instructions for the reversible drive, are applied to the record medium 6 through a dual recording head 16 comprising an erase head 17 and a record-playback head 18 through which the magnetic tape 6 is guided by a pair of guide rollers 21, 22, mounted on resilient clips 23, 24 respectively for tensioning the magnetic tape and holding it in close engagement with the dual head 16.

The record and playback apparatus 1 forming the programmer of the invention is operably connected to a motor drive, not shown, as hereinafter described, through a reduction gear 25 rotatably driving the driving roller 8 and thereby advancing the record medium 6 longitudinally at a traveling speed proportional to the speed of the motor drive. Preferably the reduction gear 25 causes the tape to be driven at a speed at which the longitudinal movement of the record medium allows recording and sensing of intelligence thereon relatively easily and efficiently without in any manner interfering with the optimum operating speeds of the motor drive, not shown.

The reduction gear is operably connected to the motor drive through a coupling connection in the form of a flexible shaft 27. In the illustrative example of the invention the shaft 27 is coupled to a motion picture projector, not shown, through a coupler that can be connected thereto at will, for example at the drive portion driving the film spools. It will be understood that in applying the invention to reversible drives a clutch of a suitable design can be employed for coupling the programmer 1 to the motor drive so the record medium can be driven in opposite directions corresponding to the directions of travel of the drive.

In the embodiment of the invention illustrated in the drawings the reduction gear 25 drives the tape 6 at a reduced speed which is proportional to the speed of the projector motor in both directions of rotation thereof.

Figure 3:
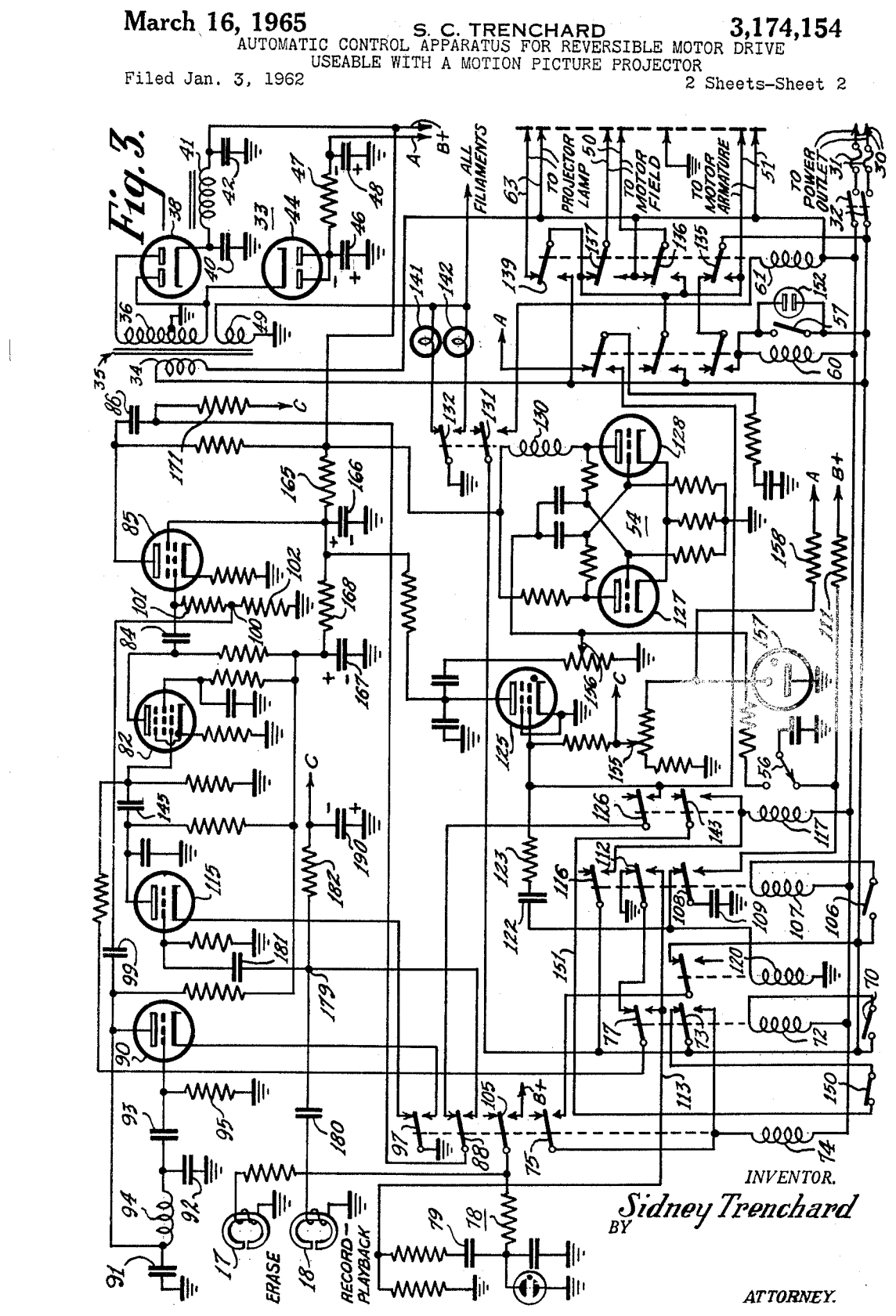

Control circuitry, according to the invention, is illustrated in FIG. 3. As illustrated, connections 30 are provided for connection of a power supply 33 to a power source, not shown, for example a 115 volts, 60 cycles outlet. The input voltage is applied through fuses 31 protecting the control apparatus. An on-off power switch 32 connects the power source to a power pack 33. When the power switch is closed a voltage is impressed on a primary winding 34 of a power transformer 35 of the power pack. The power transformer 35 is provided with a secondary winding 36 across which is connected a rectifier 38 for converting the output of the power transformer to D.C. A filter network is provided comprising an input capacitor 40, and a choke 41 and an output capacitor 42. A negative bias supply A is formed in conjunction with the winding 36 by a second rectifier 44 to which is connected a filter network comprising an input capacitor 46, a resistance 47 and an output capacitor 48. A filament winding 49 provides filament voltage for the apparatus.

Electrical connections 50, 51 to a motor field and armature respectively of a reversible motor for reversibly driving the motor drive, for example the motor of the projector in the present illustration, not shown, are provided and energized as hereafter described. When the power switch 32 is closed to operate the apparatus the motor drive or projector motor, not shown, will rotate in a forward direction or not depending upon the state of a bistable flip-flop 54 hereinafter described. Assuming that the flip-flop 54 is in a state or condition for causing a voltage to be applied to the projector motor as hereafter described and it rotates in a forward direction. A manual direction change switch 56 is provided which upon actuation reverses direction of the motor and stops it since no other switch is closed. The film is threaded in the projector, not shown, in the usual manner and the apparatus is ready for operation.

To operate the apparatus and to particularly operate it automatically an automatic operate switch 57 operable to a closed position energizes a relay 60, whose contacts are open when in a de-energized condition so that when it is energized its contacts move in a downward direction in the drawing and power is applied through the contacts of a direction control relay 61 thereby applying a voltage to the output circuits 50, 51 and to a projector lamp circuit 63. The relay 61 is a direction control relay and in the position illustrated is in a deenergized condition for permitting the motor drive to be driven in a forward direction for advancing the film.

The apparatus provides means for selecting a film length to be viewed or means to establish a given reversing cycle. For example, when the film is being driven in a forward direction when a certain film length or film frame is reached, which is desired to be seen over again, a scene selector switch 70 is momentarily manually closed electrically energizing a relay 72 illustrated in FIG. 3 in a de-energized condition so that when energized the contact 73 thereof is operated in a downward direction thereby applying a voltage to another relay 74 and electrically energizing it. When the relay 74 is energized a contact 75 thereof establishes a holding circuit so that the relay 74 remains energized upon release of the scene selector pushbutton or switch 70 and the apparatus is placed and held in a recording mode. Upon release of the pushbutton 70 the relay 72 is de-energized and drops out. However, during the time that the pushbutton is depressed a contact 77 of the relay 72 establishes a circuit to a tone control oscillator comprising relaxation oscillator 78 to apply intelligence in the form of a magnetized area on the tape 6. The audio current passes through a blocking capacitor 79 and through the relay contact 77 and is applied to an amplifier 82 where the signal is amplified and then passes through a blocking capacitor 84 to another amplifier 85 and is applied in an amplified condition through a blocking capacitor 86 and a relay contact 88 to the record-playback head 18.

A bias oscillator comprising a tube 90 and a plurality of capacitors 91, 92, 93, an inductance 94 and a resistance 95 connected to the grid of the tube 90 is operative during the recording mode of the apparatus when the relay 74 is energized. A grounded contact 97 of the relay establishes a circuit to the cathode of the tube 90 so that a magnetic biasing A.C. signal is applied through a capacitor 99 to a junction 100 of two resistances 101, 102 to provide a linear recording characteristic.

The erasehead 17 is connected to the relaxation oscillator and a contact 105 providing a connection to B+ for the oscillator, as shown. A D.C. erase voltage is applied to the erasehead during operation in the recording mode. It being understood that the magnetic tape 6 advances first through the erasehead, then the recording-playback head so that only the desired instructions for cycling the motor drive are stored on the record medium 6.

With the apparatus in this condition it is in a recording mode, as mentioned heretofore, and the projector continues in forward operation. At the end of a scene or frame terminating the desired film length, or interval corresponding to the film length, desired to be repeatedly viewed a second scene selector pushbutton 106 is momentarily manually depressed electrically energizing a relay 107. When the relay 107 is energized it closes its contacts and a movable contact 108 thereof closes a circuit to a capacitor 109 momentarily charged through a limiting resistor 111 connected to B+. A movable contact 112 establishes a connection through a lead 113 to the relaxation oscillator 78 causing it to apply a magnetizing signal to the recording head 18 through the contact 77 of the relay 72 which has dropped out and is in the condition illustrated in FIG. 3 thereby to apply another magnetizing signal to the record medium or magnetic tape 6 as heretofore described. The two magnetized points or areas on the tape 6 are spaced thereon a distance representative of the reversing cycle of the motor drive.

When the pushbutton 106 is momentarily depressed and momentarily energizes the relay 107 a movable contact 116 of the relay is closed placing a relay 117 in circuit and electrically energizing it. When the pushbutton 106 is released the contact 108 of the relay 107 returns to the position illustrated in FIG. 3 so that the charge applied to the capacitor 109 momentarily pulses a relay 120 which breaks the holding circuit holding the relay 74 allowing it to drop out. The charged capacitor 109 also applies a positive pulse through a blocking capacitor 122 and an isolating resistor 123 to the grid of a thyratron 125 causing it to fire and apply a negative pulse to the bistable multivibrator or flip-flop 54 comprising two tubes 127, 128 with the output of each coupled to the input of the other through resistance-capacitance elements, as shown. The negative pulse or trigger signal causes the flip-flop circuit to change from one state to the other. When the flip-flop changes its state a relay 130 connected to the plate of the tube 128 is actuated or pulled in operating its movable contacts 131, 132.

When the contact 131 closes it establishes an energizing circuit to the direction control relay 61 which pulls in. Once the directional relay 61 is energized its movable contacts 135, 136, 137 move to an opposite position from that illustrated in FIG. 3 the direction of rotation of the motor drive is reversed so that in the example illustrated the direction of rotation of the projector motor is reversed and it operates in a rewind or reverse direction. Moreover, a movable contact 139 is operated to a position for opening the projector lamp circuit or connections 63 so that the projector does not project during the rewind cycle. The apparatus is now in a playback mode.

When the contacts 131, 132 of the relay 130 are operated to a position corresponding to the energized condition of this relay a light 141 connected to the filament winding 49 of the power transformer 35 goes off. This light when "on" indicates that the motor drive or motion picture projector is being driven in a forward direction. In its actuated position the contact 132 closes a circuit to another lamp 142 indicating that the motor drive or motion picture projector is being driven in a reverse direction. The contact 143 in a closed condition holds the relay 117 energized and the apparatus will operate automatically until it is desired to go back to manual operation.

With the projector running in a reverse or rewind direction the tape 6 is driven in the same opposite direction as the projector motor and through the record playback head 18 and the erase head 17. When the first magnetized signal or magnetized area or point on the record medium 6 is sensed by the playback head 18 a signal is applied through a three stage amplifier of the apparatus comprising three tubes or stages 115, 82 and 85. The input amplifier 115 takes the signal off the playback head 18 and amplifies it and then applies it through a capacitor 145 to the grid of the second stage amplifier 82 where it is further amplified and applied through the blocking capacitor 84 to the grid of the tube 85 and applied through the blocking capacitor 86 and through a contact 88 of the relay 74 and then through contact 126 of the relay 117 to the grid of the thyratron 125 causing it to trigger again. This causes a negative pulse or trigger signal to be applied to the flip-flop circuit 54 which again changes its state to another stable state.

In this other stable state the relay 130 connected in the anode circuit of the tube 128 drops out allowing the direction control relay 61 to also drop out. When the direction control relay 61 drops out the projector immediately goes into a forward operation and the projector lamp circuit is closed so that the projector lamp is energized. When the film is advanced the second magnetized area on the tape is sensed by the playback head 18 and electrical signal is developed by it and amplified as heretofore described and applied to the grid of the thyratron 125 triggering it causing it to apply a pulse to the flip-flop circuit 54 which changes it to the other stable state. In this other stable state the relay 130 is again energized pulling in so the direction control relay 61 causes the projector motor to reverse direction or operate in a rewind direction and break the projector lamp circuit 63.

The first impressed magnetic area or point is again reached on the tape and another pulse or command signal is generated and applied to the flip-flop circuit to change it to the other stage causing the relay 130 to drop out and the direction control relay 61 to drop out so that the projector will run in a forward direction. In this manner the projection motor or motor drive is reversibly driven in a predetermined programmed cycle corresponding to the length of film desired to be viewed in successive sequences. It will be understood, therefore, that the viewers of the film can view any selected length of film selected by the same selectors heretofore described at various times for any desired length of time so that the film events can be scrutinized and studied in detail, for example in ruling on fouls in races or other desired studies.

In order to return the apparatus to complete manual operation a normally closed pushbutton switch 150 is momentarily depressed and it momentarily opens a circuit lead 151 allowing the relay 117 to drop out. Manual control is carried out by operating the manual operate switch 56 connected to the flip-flop 54 for pulsing it and changing its state thereby to operate the direction control relay 61 as described above. The apparatus is returned to automatic operation by operating the scene selector pushbuttons in the sequence heretofore described.

While the apparatus is operating in an automatic mode if at any time the automatic operate switch 57 is opened while the directional control relay is in a condtion for causing the projector motor to drive the projector forward the projector will continue in a forward direction until the last frame or scene of the length of film being viewed is reached. Upon reaching the end scene the apparatus will reverse the projector and cause it to go back to the first scene selected on the film being viewed and will reverse the projector again to forward operation but will not cause it to again operate in the forward direction. The projector will then stop and remain stopped until the automatic operate switch 57 is again closed. Since the projector is stopped immediately upon reversal to the forward direction upon closing of the automatic operate switch the projector starts projecting the scenes selected.

In the event the automatic operate switch 57 is opened during automatic operation with the projector in a rewind condition the projector will continue to rewind until the beginning of the scene selected and then reverse the projector to the forward condition and stop it. It will not run again until the automatic operate switch 57 is again closed. It is apparent, therefore, that regardless of when the switch 57 is opened during automatic operation the projector will function to prepare the cycle for repetition of the scenes immediately upon reclosing of the automatic operate switch 57.

The apparatus is provided with a remote control switch socket 152 in parallel with the automatic operate switch 57. Momentarily closing a remote control switch, not shown, connected to the remote control socket would start the whole cycle going so that the projector would complete the cycle, show the scenes, rewind and go into forward operation condition and then remain there with the lamp off.

The control circuit is provided with control or adjustment elements comprising a potentiometer 155 for controlling the holdoff bias on the thyratron 125 and a pulse level adjust comprising a potentiometer 156 adjustable so that the negative pulse from the thyratron when it fires is at a proper operating level for triggering the bistable multivibrator 54. The bias supply A is connected to a gas filled regulator tube 157 through a limiting resistor 158 which regulates the bias voltage to a fixed value, for example 100 volts. The regulator tube is connected to the holdoff bias adjust potentiometer 155 and eliminates transients from the line voltage, for example due to motors starting or any heavy loads.

The control circuitry is provided with elements for precluding misoperation. Two decoupling networks comprising a resistance 165 and a capacitor 166 and a second resistance 168 and capacitor 167 combination prevent feedback from the output stage of the amplifier arrangement to the input. Several circuit leads designated C are connected together. Thus, tracing the output of the output stage tube 85 out through the output capacitor 86 it will be seen that the output can pass through the normally closed contact 88 of the relay 74 and through the normally open contact 126 of the relay 117 connected to the grid of the thyratron 125. Since the lead from the output capacitor 86 to the contact 88 is not connected anywhere this lead would be at zero potential and when the relay 117 closed it would cause a momentary undesired pulse to appear on the grid of the thyratron which would trigger it when the relay 117 closes. Both sides of this relay are brought to the same potential by tying the relay 117 through the contact 88 to an isolating resistor 171 that ties the lead from the amplifier output capacitor 86 to the contact 88 to the potential of the thyratron grid, D.C.-wise, so that a signal will not inadvertently appear on it.

Moreover, a junction 179 of a capacitor 180, a capacitor 181 and the contact 88 are connected through an isolating resistance 182 to point C in order to keep a pulse from appearing in the circuit when the relay 74 is actuated. The amplifier output capacitor 86 is connected through the isolating resistance 171 to the arm of the adjust potentiometer 155. All of these associated circuit leads designated C are grounded, A.C.-wise, through a capacitor 190 so that no feedback signal can pass from the output to the input which would cause howling and undesired oscillations.

The invention thus provides control apparatus for cycling and reversibly operating a reversible motor drive in cycles settable at will. It is apparent that while the scene selector pushbuttons are operated to select a particular length of film to be repetitively viewed in the illustration described these pushbuttons can be used in other applications to set a desired interval in process equipment, machines and the like.

The control apparatus provides a method of repetitively viewing given portions of films, for example, at races both by stewards, judges and the like and by the public in apparatus operating projectors conveniently located for this purpose.

While a preferred embodiment of the motor drive control apparatus, according to the invention, has been shown and described it will be understood that many modifications and changes can be made within the true spirit and scope of the invention.

What I claim and desire to secure by Letters Patent is:

1. In combination, with a motion picture projector having a projection lamp and a reversible motor drive, for reversibly driving film transport mechanism on said projector, means electrically connected to said motor drive responsive to command signals for reversibly driving said motor drive, a record medium driven at a speed proportional to the speed of said motor drive, means operably connected to said motor drive for reversibly driving said record medium in correspondence with said motor drive, means to record at will intelligence on said record medium while driven corresponding to instructions for reverse operation of said drive, film transport mechanism, means to sense said record medium, while being driven, means responsive to said sensing means for generating command signals and applying them to said means for reversibly driving said drive to cause the last-mentioned means to cyclically reverse direction of travel of said drive in response to sensing of said instructions on said record medium.

2. In combination, with a motion picture projector having a projection lamp and a reversible motor drive, for reversibly driving film transport mechanism on said projector, means electrically connected to said motor drive responsive to command signals for reversibly driving said motor drive, an endless, magnetizable record medium driven at a speed proportional to the speed of said motor drive, means operably connected to said motor drive in operation for reversibly driving said record medium in correspondence with said motor drive, means to record and store at will magnetization on said record medium while drawn at two separate spaced points corresponding to instructions for reverse operation of said drive, and a length of film to be repetitively viewed, means to sense said two points on said record medium, means responsive to said sensing means for generating command signals and applying them to said means for reversibly driving said drive to cause the last-mentioned means to cyclically reverse direction of travel of said drive in response to sensing of said points.

3. The combination according to claim 2, in which said means for reversibly driving said motor drive comprises means for turning off said projection lamp during operation of said motor drive in a direction corresponding to a film rewind direction of operation.

4. In combination, a reversible motor drive, means responsive to command signals electrically connected to said motor drive for causing said motor drive to operate in opposite directions, means for receiving a magnetizable record medium for recording commands thereon including means operably connected to the motor drive for driving said record medium in opposite directions at a speed proportional to the speed of said motor drive, means to record at will at variable times two time-spaced magnetized spots on said record medium including means for recording thereon while said record medium is traveling, means to sense said magnetized spots alternatively on said record medium while traveling first in one direction and then in an opposite direction, means connected to said sensing means responsive to sensing of said magnetized spots for generating two time-spaced command pulse signals corresponding to signals for said motor to operate alternately in opposite directions, and means for applying said command pulse signals to said means responsive to command signals to cause the motor drive to continuously alternately reverse direction of travel in response to alternate sensing of said time-spaced magnetized spots thereby to cause alternate sensing of said magnetized spots.

5. In the combination according to claim 4, in which said means to cause said motor drive to operate alternately comprises means to apply electrical signals to said motor alternately, and in which said means to record at will on said record medium comprises a recording head and means to apply at will instructions to said head to record on said record medium, and in which said sensing means comprises a playback head.

6. In combination, a reversible motor drive, means responsive to command signals electrically connected to said motor drive for causing said motor drive to operate in opposite directions, means for receiving a magnetizable record medium for recording commands thereon including means operably connected to the motor drive for driving said record medium in opposite directions at a speed proportional to the speed of said motor drive, means to record at will at variable times two time-spaced magnetized spots on said record medium including means for recording thereon while said record medium is traveling, means to sense said magnetized spots alternately on said record medium while traveling first in one direction and then in an opposite direction, means connected to said sensing means responsive to sensing of said magnetized spots for generating two time-spaced command pulse signals corresponding to signals for said motor to operate alternately in opposite directions, and means for applying said command pulse signals to said means responsive to command signals to cause the motor drive to continuously alternately reverse direction of travel in response to alternate sensing of said magnetized spots, and means to cause said motor drive to discontinue continuous reverse operation in response to said means responsive to command signals.

References Cited by the Examiner
UNITED STATES PATENTS 2,514,578  7/50  Heller et al. _____ 179—100.2
2,542,506  2/51  Gibson.
2,631,855  3/53  Kornei _____ 88—28 X NORTON ANSHER, Primary Examiner.

WILLIAM MISIEK, Examiner.